April 23, 1929.  J. E. HITCHCOCK  1,710,092
CHAIN TOOL
Filed Jan. 29, 1924
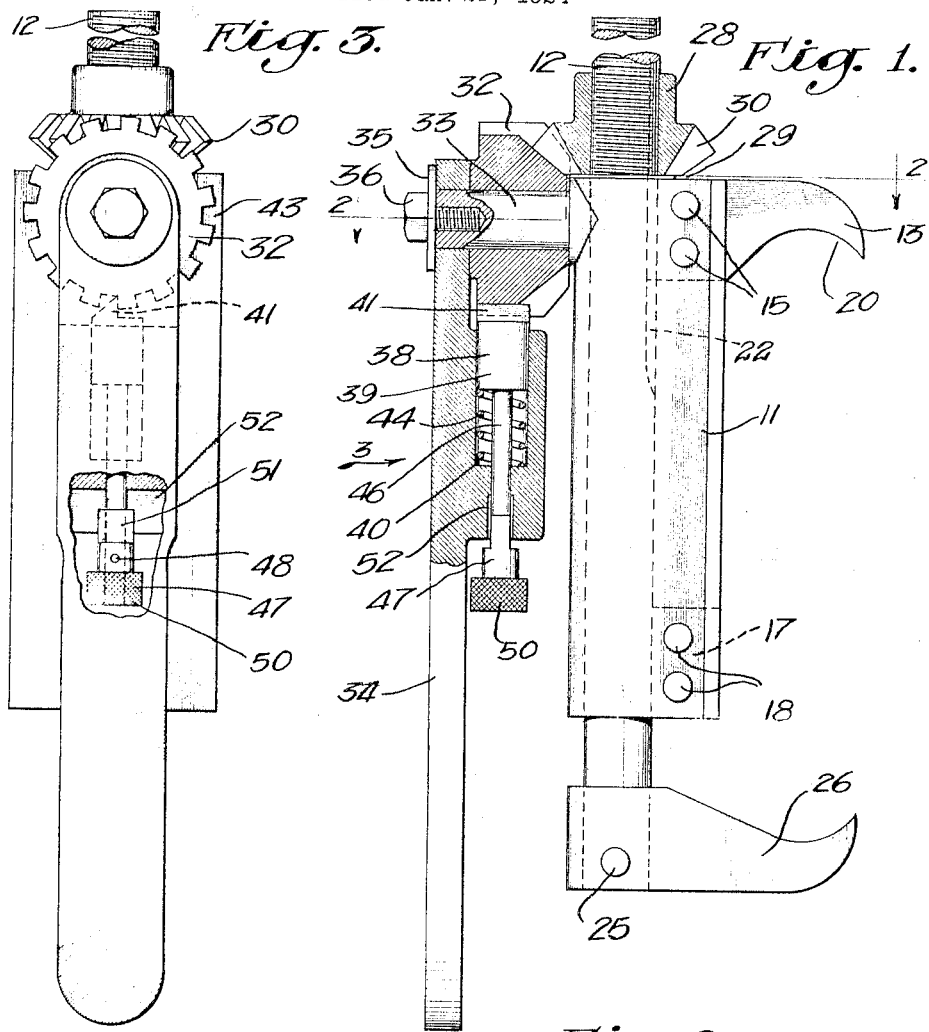
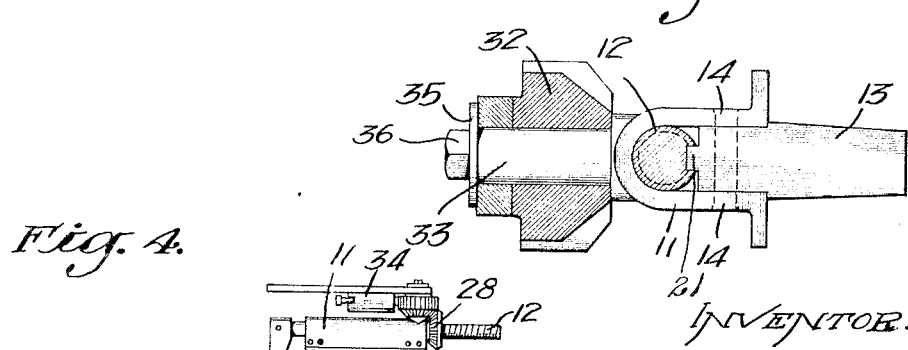
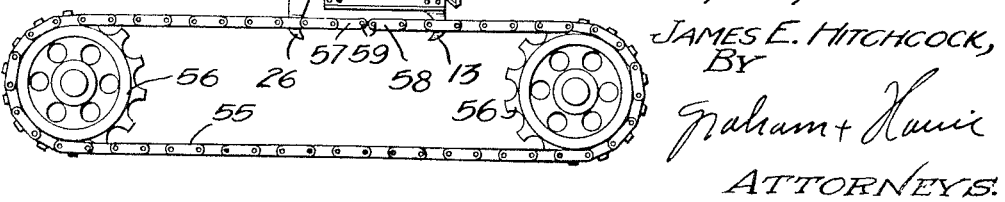
INVENTOR:
JAMES E. HITCHCOCK,
BY
Graham + Harris
ATTORNEYS.

Patented Apr. 23, 1929.

1,710,092

UNITED STATES PATENT OFFICE.

JAMES E. HITCHCOCK, OF FULLERTON, CALIFORNIA.

CHAIN TOOL.

Application filed January 29, 1924. Serial No. 689,257.

This invention relates to chain repair tools and relates particularly to a tool which may be of much value in the installing of heavy link chains.

On much of the heavier machinery, link chains running over sprocket wheels are used to transfer the rotation of one shaft to another. In the oil well industry, chains of large size are used extensively. In installing these heavy chains, either initially or in making repairs or shortening the chain, the services of three men are often required.

It is the principal object of the invention to provide a tool which may be used in installing link chains and which by its use, will make it possible for one man to easily accomplish the installation.

The specific advantages and further objects of the invention will be made evident hereinafter.

Referring to the drawings which are for illustrative purposes only,

Fig. 1 is a side elevation of my invention partially sectioned to show the various features thereof.

Fig. 2 is a section taken on a plane represented by the line 2—2 of Fig. 1.

Fig. 3 is a view taken at right angles to Fig. 1 as indicated by the arrow 3 of Fig. 1.

Fig. 4 is a view showing the utility of the invention.

As shown in Figs. 1, 2 and 3 of the drawings, my invention consists of a body member 11, which is of channel shape as shown. Extending through the channel member 11, is the shaft or rod 12, which is retained in the rounded bottom of the channel by the inner face of the primary finger 13 which is secured between the side walls 14 of the body 11 by the rivets 15; and by the inner face of the spacing block 17 which is secured between the walls 14 by rivets 18. The outer portion of the finger 13 is of semi-hooked shape as indicated at 20 and the inner portion has a key 21 formed thereon which cooperates with the longitudinal channel or key way 22 formed in the rod 12 to prevent it from rotating. Secured to the lower or outer end of the rod 12, as by means of the rivet 25 is a secondary finger 26, which resembles the primary finger 13, which secondary finger is inverted relative to the finger 13.

Threaded on the upper end of the shaft 12 is a nut 28 which rests on the upper face 29 of the body 11 and which has bevel teeth 30. Engaging the nut 28 is a bevel gear 32 which is free to rotate on the stub shaft or post 33 extending laterally from the body 11. Also placed on the post 33 is a lever 34, the lever 34 and the bevel gear 32 being retained on the post by the washer 35 and the cap screw 36. The lever 34 is provided with a dog or pawl 38 having a barrel 39 which rests in the bore 40 of the lever. The barrel has a tooth 41 formed at the outer end thereof which is adapted to engage the slots 43 or ratchet teeth of the gear 32, there being a spring 44 to hold the tooth in engagement with the slots 43. There extends from the piston 39, a shaft 46, shown as parallel with the lever 34, on the lower or outer end of which shaft a head 47 is secured by the pin 48. The head 47 provides a knurled grip 50 and a cylindrical extension, which is flattened at 51, resting in the slot 52 formed in the lever 34. The purpose of the slot 52 and the flat portion 51 is to keep the tooth 41 in proper engaging position. By pulling downwardly on the knurled portion 50 and rotating the member 38 one half a turn, the ratchet will operate in reversed direction.

In Fig. 4, the device is shown as applied to practical use. As shown in this figure, the primary and secondary teeth 13 and 26 are extended through links of the chain 55 which runs over the sprocket wheel 56. The ratchet 38 being set properly, the lever is reciprocated, which action turns the nut 28 through the gear 32; thereby moving the teeth 13 and 26 together and drawing up the chain 55, so that end links 57 and 58 will be brought together to enable the placement of a coupling pin; after which the ratchet 38 is reset to actuate in the opposite direction and the lever swung to spread the teeth, after which the tool is removed.

The chain tool as just described holds the chain 55 securely in proper position; thereby eliminating the services of two men who were previously necessary and making it possible for one man to easily install the chain.

I claim as my invention:

A device of the class described, comprising: a stationary member consisting of a body having an axial passage therethrough, a post integral with said body, and a primary finger secured to said body and having a key formed thereon this finger being arranged to engage a link of a chain; a movable member being provided comprising a rod channeled to receive said key for preventing the rotation of said rod, and a secondary finger secured to said rod and arranged to engage another link in said chain; and operating mechanism consisting of a nut threaded on the end of said shaft, a gear rotatably mounted on said post and in engagement with said nut, a lever swingably secured on said post, and a ratchet dog housed beneath said lever and comprising a shaft extending substantially parallel therewith.

In testimony whereof, I have hereunto set my hand at Los Angeles, California, this 23rd day of January, 1924.

JAMES E. HITCHCOCK.